US010899461B2

(12) United States Patent
Livieratos et al.

(10) Patent No.: US 10,899,461 B2
(45) Date of Patent: Jan. 26, 2021

(54) VERTICAL LIFT BY SERIES HYBRID-PROPULSION

(71) Applicant: Aurora Flight Sciences Corporation, Manassas, VA (US)

(72) Inventors: Evangelos Livieratos, Manassas, VA (US); Riley Griffin, Manassas, VA (US); Nathan Varney, Manassas, VA (US); Amanda Kaufman, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 448 days.

(21) Appl. No.: 15/866,655

(22) Filed: Jan. 10, 2018

(65) Prior Publication Data

US 2018/0194484 A1    Jul. 12, 2018

Related U.S. Application Data

(60) Provisional application No. 62/444,548, filed on Jan. 10, 2017.

(51) Int. Cl.
*B64D 27/24* (2006.01)
*B64D 27/04* (2006.01)
(Continued)

(52) U.S. Cl.
CPC .............. *B64D 27/24* (2013.01); *B64C 27/08* (2013.01); *B64C 39/024* (2013.01); *B64D 27/04* (2013.01);
(Continued)

(58) Field of Classification Search
CPC ............ B64D 2027/026; B64D 27/024; B64D 27/24; B64C 2201/027; B64C 2201/042;
(Continued)

(56) References Cited

U.S. PATENT DOCUMENTS 2,817,322 A    4/1956  Miller
2010/0287932 A1*  11/2010  Tanaka ................... F02B 37/10
                                                    60/602
(Continued)

FOREIGN PATENT DOCUMENTS

DE    102010025002 A1    12/2011
DE    102014224637 A1     6/2016
KR       10-1667330      10/2016

OTHER PUBLICATIONS

Michael Paul Thompson, B.M.E., "Non-Mechanical Supercharging of a Four-Stroke Diesel Engine," A Thesis Presented in Partial Fulfillment of the Requirements for the Degree Master of Science, The Ohio State University, 1968.
(Continued)

*Primary Examiner* — Christopher P Ellis
(74) *Attorney, Agent, or Firm* — Michael Stanley Tomsa; McAndrews, Held & Malloy, Ltd.; Eugene H. Nahm

(57) ABSTRACT

A hybrid-electric aerial vehicle is disclosed comprising: an airframe; a plurality of longitudinal booms extending radially from the airframe; a passively charged internal combustion engine operatively coupled with a fuel tank, a generator operatively coupled with the passively charged internal combustion engine; a battery bank operatively coupled with the generator; and a plurality of motors. The passively charged internal combustion engine has an intake engine valve, an exhaust engine valve, and a combustion chamber, wherein the intake engine valve is delayed to provide an expansion ratio in the combustion chamber that is greater than a compression ratio in the combustion chamber. Each of said plurality of motors may be positioned at a distal end of one of said plurality of longitudinal booms and
(Continued)

be operatively coupled with a propeller, wherein the plurality of motors is electrically coupled with the battery bank and the generator.

19 Claims, 9 Drawing Sheets

(51) Int. Cl.
    *B64C 27/08*     (2006.01)
    *F02B 41/04*     (2006.01)
    *F02D 13/02*     (2006.01)
    *F02N 11/04*     (2006.01)
    *B64C 39/02*     (2006.01)
    *F02B 63/04*     (2006.01)
    *B64D 27/02*     (2006.01)
    *F02B 75/34*     (2006.01)
    *F02D 29/06*     (2006.01)

(52) U.S. Cl.
    CPC .......... *F02B 41/04* (2013.01); *F02D 13/0269* (2013.01); *B64C 2201/027* (2013.01); *B64C 2201/042* (2013.01); *B64C 2201/044* (2013.01); *B64D 2027/026* (2013.01); *F02B 63/04* (2013.01); *F02B 75/34* (2013.01); *F02B 2275/32* (2013.01); *F02D 29/06* (2013.01); *F02N 11/04* (2013.01); *Y02T 10/12* (2013.01); *Y10S 903/903* (2013.01)

(58) Field of Classification Search
    CPC .... B64C 2201/044; F02B 63/04; F02B 75/34; F02B 2273/32; F02D 31/002; F02D 31/07; F02D 33/006; Y02T 10/142; Y10S 903/903

USPC ........................................................ 244/58
See application file for complete search history.

(56) References Cited

U.S. PATENT DOCUMENTS

| 2015/0275818 | A1* | 10/2015 | Fujimoto | F02M 25/12 |
| | | | | 60/285 |
| 2016/0032990 | A1 | 2/2016 | Nedorezov et al. | |
| 2016/0280386 | A1* | 9/2016 | Mestler | B64D 31/06 |
| 2016/0311544 | A1 | 10/2016 | Phan et al. | |
| 2016/0325629 | A1 | 11/2016 | Siegel et al. | |
| 2017/0066531 | A1* | 3/2017 | McAdoo | H02J 7/34 |
| 2019/0263519 | A1* | 8/2019 | Argus | B64C 39/024 |
| 2019/0283874 | A1* | 9/2019 | Phan | B64D 27/24 |

OTHER PUBLICATIONS

Helmuth William Engelman, "Surge Phenomena in Engine Scavenging," A thesis submitted to the Graduate School of the University of Wisconsin in partial fulfilmemt of the requirements for the degree of Doctor of Philosophy, May 19, 1953.

Van Livieratos, "Vertical Lift by Series Hybrid Power" Proposal Summary, Form Generated on Mar. 10, 2016.

The International Search Report and the Written Opinion, dated Apr. 23, 2018, in International application No. PCT/US2018/013063, filed on Jan. 10, 2018.

"Miller cycle—Wikipedia, the free encyclopedia" May 11, 2007 (May 11, 2007).

XP002699145, "Internal combustion engine—Wikipedia, the free encyclopedia")—Mar. 27, 2009 (Mar. 27, 2009).

Extended European search report for Application No. 18738802.0, dated Aug. 10, 2020, pp. 1-9, European Patent Office, Germany.

* cited by examiner

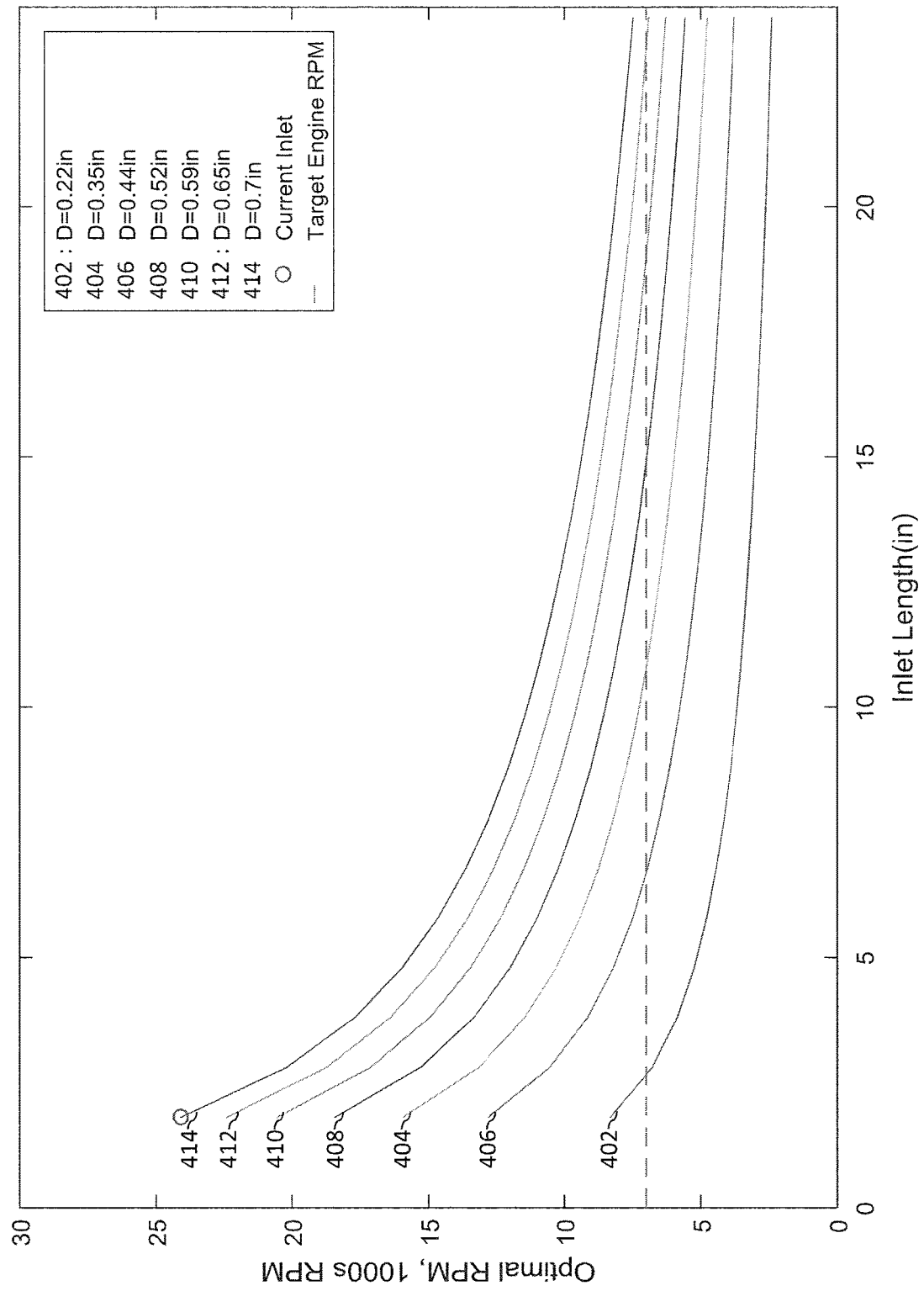

VERTICAL LIFT BY SERIES HYBRID-PROPULSION

CROSS-REFERENCE TO RELATED APPLICATIONS

The present application claims the benefit under 35 U.S.C. § 119(e) of provisional patent application Ser. No. 62/444,548, filed Jan. 10, 2017, the contents of which are hereby incorporated by reference.

STATEMENT OF GOVERNMENT INTEREST

This invention was made with government support under Contract Number: NNX15CA29P awarded by the National Aeronautics and Space Administration (NASA). The government has certain rights in the invention.

TECHNICAL FIELD

The present invention relates to the field of unmanned aircraft and, more particularly, a vertical lift aircraft having a passively charged, positive expansion ratio engine cycle that uses delayed intake engine valve timing to allow the expansion ratio to be greater than the compression ratio.

BACKGROUND

A major market for vertical lift aircraft is in urban operations, primarily for municipal operations and electronic newsgathering (i.e., gathering of audio, video, photography, and other data). These operations necessitate sizeable requirements in terms of vehicle range, endurance, and payload capability. Small-unmanned multi-rotors (e.g., quad-copters) typically have direct electric drive, where a battery drives an electric motor that is directly coupled to the propeller. A benefit of this configuration is its simple and high fidelity control. The current generation of unmanned vertical lift aircraft, however, is unable to meet these requirements. Accordingly, the present state of the art is limited to manned vehicle platforms, typically Bell 206 or Eurocopter AS350 helicopter (both with a vehicle weight of about 2000 pounds (lbs). As can be appreciated, the operation of these helicopters is expensive in terms of, inter alia, fuel consumption, environmental emissions, and labor.

To compete with manned observation platforms, unmanned aircraft, whether multi-rotor or fixed wing, need to come much closer to matching the capabilities of manned observation platforms in terms of endurance and payload capacity, which is not currently possible with existing all-electric multi-rotor aircraft. For instance, existing all-electric multi-rotor aircraft provide an endurance of two-hours of basic hover operation with no payload. In order to compete with the manned market, this endurance needs to be maintained, if not increased, while also carrying sufficient payload and executing functional flight maneuvers to compete with the systems on the manned platforms. To accomplish this, the unmanned aircraft will need to be significantly scaled up, and the stored energy onboard the vehicle needs to increase considerably in order to support both the payload weight and endurance requirements (with an increased fuel weight fraction).

Accordingly, a need exists for an engine system, such as a series hybrid-propulsion system, for enhancing the range and endurance of multi-rotor and other unmanned vehicles. To that end, disclosed herein is a system and method to both increase the endurance of small-unmanned vertical lift aircraft and to overcome, inter alia, fuel mixing issues historically associated with internal combustion engines sized for small-unmanned aerial system (sUAS).

SUMMARY OF THE INVENTION

The present invention is directed to an unmanned aerial vehicle having a series hybrid-propulsion system, where, in one aspect, the series hybrid-propulsion system employs a passively charged, positive expansion ratio engine cycle ("passive charge cycle"), which uses delayed intake engine valve timing to allow the expansion ratio to be greater than the compression ratio.

According to a first aspect, a hybrid-electric aerial vehicle comprises: an airframe; a plurality of longitudinal booms extending radially from the airframe; a passively charged internal combustion engine operatively coupled with a fuel tank, the passively charged internal combustion engine having at least one cylinder comprising a combustion chamber, an intake engine valve, and an exhaust engine valve, wherein the intake engine valve and the exhaust engine valve are in fluid communication with the combustion chamber and configured, respectively, to selectively allow air in and out of the combustion chamber during operation, wherein the intake engine valve is controlled to provide an expansion ratio in the combustion chamber that is greater than a compression ratio in the combustion chamber; a generator operatively coupled with the passively charged internal combustion engine, wherein the generator is configured to generate AC power via a rotational engine force received from the passively charged internal combustion; a rectifier electrically coupled with the generator, wherein the rectifier converts AC power from the generator to DC power; a battery bank electrically coupled with the rectifier, the battery bank configured to store DC power via said rectifier; and a plurality of motors, each of said plurality of motors positioned at a distal end of one of said plurality of longitudinal booms and being operatively coupled with a propeller, wherein each of the plurality of motors is electrically coupled with the battery bank and the generator via an electronic speed controller (ESC).

According to a second aspect, a series hybrid-propulsion system comprises: a passively charged internal combustion engine operatively coupled with a fuel tank, the passively charged internal combustion engine having at least one cylinder comprising a combustion chamber, an intake engine valve, and an exhaust engine valve, wherein the intake engine valve and the exhaust engine valve are in fluid communication with the combustion chamber and configured, respectively, to selectively allow air in and out of the combustion chamber during operation, wherein the intake engine valve is controlled to provide an expansion ratio in the combustion chamber that is greater than a compression ratio in the combustion chamber; a generator operatively coupled with the passively charged internal combustion engine, wherein the generator is configured to generate AC power via a rotational engine force received from the passively charged internal combustion; a rectifier electrically coupled with the generator, wherein the rectifier converts AC power from the generator to DC power; a battery bank electrically coupled with the rectifier, the battery bank configured to store DC power via said rectifier; and a plurality of motors electrically coupled with the battery bank and the generator via an electronic speed controller (ESC).

According to a third aspect, a series hybrid-propulsion system comprises: a passively charged internal combustion engine operatively coupled with a fuel tank, the passively charged internal combustion engine having at least one cylinder comprising a combustion chamber, an intake engine valve, and an exhaust engine valve, wherein the intake engine valve and the exhaust engine valve are in fluid communication with the combustion chamber and configured, respectively, to selectively allow air in and out of the combustion chamber during operation, wherein the intake engine valve is controlled in accordance with the Miller cycle to provide an expansion ratio in the combustion chamber that is greater than a compression ratio in the combustion chamber; a generator operatively coupled with the passively charged internal combustion engine, wherein the generator is configured to generate AC power via a rotational engine force received from the passively charged internal combustion; a rectifier electrically coupled with the generator, wherein the rectifier converts AC power from the generator to DC power; a battery bank electrically coupled with the rectifier, the battery bank configured to store DC power via said rectifier; and a plurality of motors electrically coupled with the battery bank and the generator via an electronic speed controller (ESC), wherein each of the plurality of motors operates at a variable rotation per minute (RPM) while the passively charged internal combustion engine operates at a constant RPM.

According to a fourth aspect, a method for driving a hybrid-propulsion system comprises: providing a passively charged internal combustion engine operatively coupled with a fuel tank, the passively charged internal combustion engine having at least one cylinder comprising a combustion chamber, an intake engine valve, and an exhaust engine valve, wherein the intake engine valve and the exhaust engine valve are in fluid communication with the combustion chamber; selectively conveying air in and out of the combustion chamber in accordance with the Miller cycle to provide an expansion ratio in the combustion chamber that is greater than a compression ratio in the combustion chamber; generating AC power via a rotational engine force received at a generator from the passively charged internal combustion, wherein the generator is operatively coupled with the passively charged internal combustion engine; converting AC power from the generator to DC power via a rectifier electrically coupled with the generator; storing DC power via said rectifier to a battery bank electrically coupled with the rectifier; and operating an electric motor at a variable rotation per minute (RPM) via an electronic speed controller (ESC) while the passively charged internal combustion engine operates at a constant RPM.

In certain aspects, the generator is directly coupled with the passively charged internal combustion engine.

In certain aspects, the generator is coupled with the passively charged internal combustion engine via a driveshaft.

In certain aspects, the timing of the intake engine valve is delayed in accordance with the Miller cycle.

In certain aspects, the passively charged internal combustion engine operates at a constant rotation per minute (RPM).

In certain aspects, each of the plurality of motors operates at a variable RPM while the passively charged internal combustion engine operates at the constant RPM.

In certain aspects, the plurality of motors is configured to provide both lift and propulsion.

In certain aspects, the timing of the intake engine valve is delayed such that the intake engine valve is held open by a predetermined period of time longer than prescribed by the Otto cycle.

In certain aspects, the generator is configured to receive DC power from the battery bank to output a rotational starter force to the internal combustion engine, thereby operating as a starter motor for the internal combustion engine.

DESCRIPTION OF THE DRAWINGS

These and other advantages of the present invention can be readily understood with the reference to the following specifications and attached drawings wherein:

FIG. 4a illustrates the results of an analytical study of estimated inlet geometry requirements.

DETAILED DESCRIPTION

Figure 1:
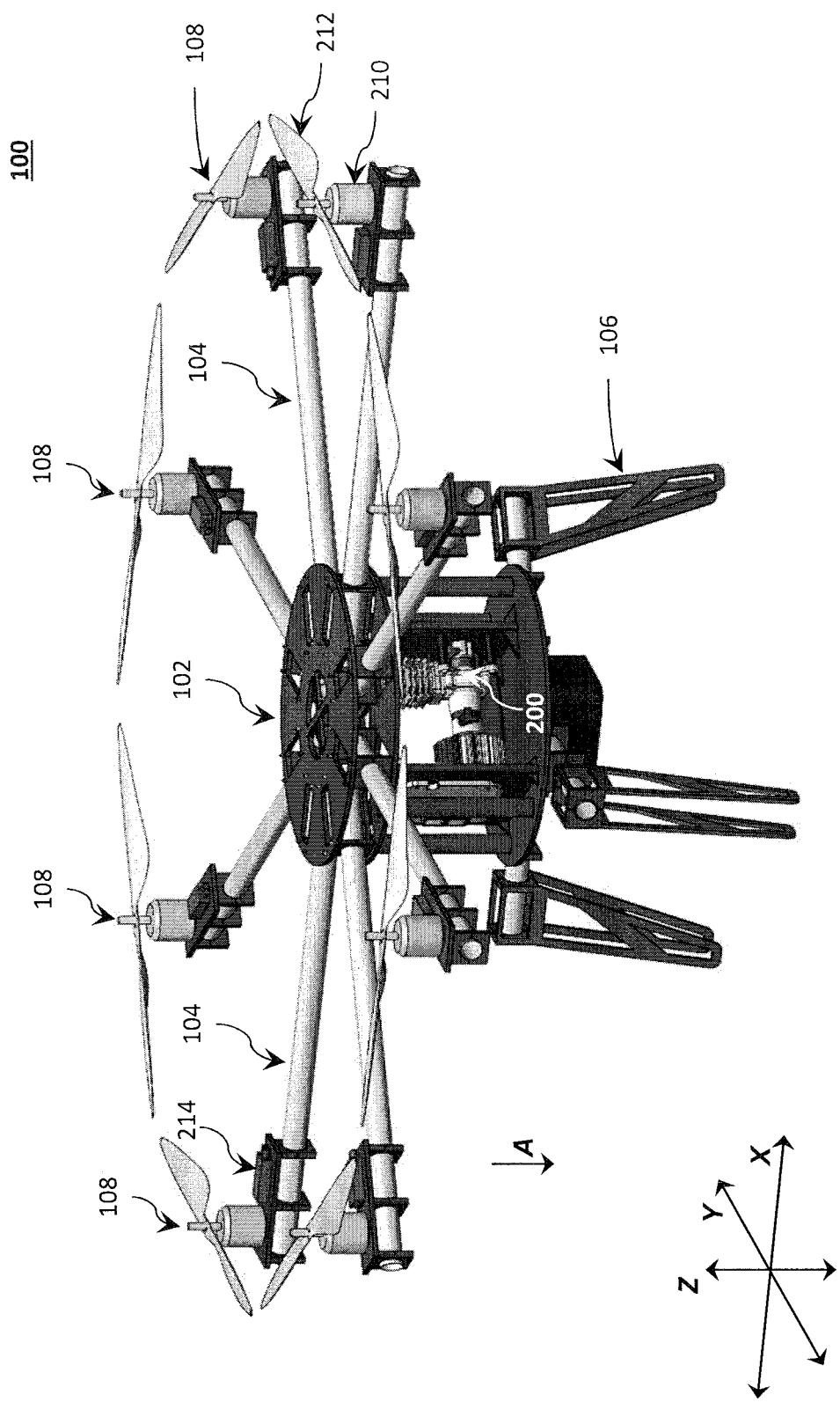
FIG. 1 illustrates a suitable multi-rotor aircraft embodying a hybrid-propulsion system.

Preferred embodiments of the present invention are described hereinbelow with reference to the accompanying drawings. In the following description, well-known functions or constructions are not described in detail because they may obscure the invention in unnecessary detail. For this disclosure, the following terms and definitions shall apply.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. Similarly, as utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The present invention is directed to a series hybrid-propulsion system for enhancing the range and endurance of unmanned multi-rotor aerial vehicles, which can offer a number of advantages over manned aircraft. In one aspect, the series hybrid-propulsion system employs a passively charged, positive expansion ratio engine cycle ("passive charge cycle"), which uses delayed intake engine valve timing to allow the expansion ratio to be greater than the compression ratio.

As is appreciated by those of skill in the art, a compression ratio, as used in connection with an internal-combustion engine, refers to a value that represents the ratio of the volume of its combustion chamber from its largest capacity to its smallest capacity (i.e., during a compression stroke). Conversely, an expansion ratio, as used in connection with an internal-combustion engine, refers to a value that represents the ratio of the volume of its combustion chamber from its smallest capacity to its largest capacity (i.e., a power stroke, aka expansion stroke).

On the environmental emissions side, unmanned multi-rotor aerial vehicles (including small-unmanned aerial systems (sUAS)) have an advantage over manned vehicles due to their size, while manned vehicles are significantly larger and correspondingly burn more fuel; thereby resulting in a significant emissions penalty. In addition to the emission benefit, replacing manned observatory platforms with unmanned observatory platforms would reduce fuel and labor costs, as well as initial capital costs.

Increasing unmanned multi-rotor aerial vehicle endurance and payload capability poses a hurdle in producing a multi-rotor platform viable for the urban operations market. One of the primary challenges in designing a hybrid-propulsion system for unmanned aerial vehicles is the design and implementation of the propulsion control system. Small-unmanned multi-rotors typically have direct electric drive, where a battery drives an electric motor that is directly coupled to the propeller. The electric drive for vertical lift typically relies on lithium polymer batteries for energy storage.

A battery's specific/usable energy, however, is extremely low compared to internal combustion fuels. As illustrated in Table 1, gasoline has an approximately 15× advantage over rechargeable batteries, while diesel has about an 18× advantage.

TABLE 1

| Energy Storage | Energy Density | Efficiency | Usable Energy |
| --- | --- | --- | --- |
| Gasoline | >44 MJ/kg | 30% | >13 MJ/kg |
| Ultra-Low Sulfur Diesel | >45 MJ/kg | 40% | >16 MJ/kg |
| Li—Po Battery | <1 MJ/kg | 90% | <0.9 MJ/kg |

A suitable multi-rotor aircraft 100 embodying the disclosed hybrid-propulsion system 200 is illustrated in FIG. 1. As illustrated, the multi-rotor aircraft 100 (a form of VTOL aircraft) generally comprises an airframe 102 (e.g., a fuselage), a plurality of longitudinal booms 104 extending radially from the airframe 102, landing gear 106, and a plurality of propulsors 108 (e.g., as illustrated, an electric motor 210 having a motor-driven a propeller 212). Each of said plurality of propulsors 108 are placed at a distal end of a longitudinal boom 104 and oriented to direct thrust downward (relative to the vehicle, direction A). An electronic speed controller (ESC) 214 may also be provided adjacent the electric motor 210 at the distal end of a longitudinal boom 104.

The multi-rotor aircraft 100 may be fabricated from metal, a composite material, or a combination thereof. The hybrid-propulsion system 200 may be positioned substantially centered in the airframe 102, thereby ensure balance of the multi-rotor aircraft 100 during flight (e.g., in the X-Y plane). While the multi-rotor aircraft 100 is illustrated as having eight propulsors 108 (i.e., an octo-rotor aircraft), a person of skill in the art would understand that additional, or fewer, propulsors 108 may be employed depending on, for example, thrust requirements. The multi-rotor aircraft 100 may be, for example, 50-100 inches in diameter, more preferably about 70 inches, and 10-40 inches tall, more preferably about 23 inches. Such a multi-rotor aircraft 100 is able to hover for 1 hour and a payload capacity of 1630 g. Reducing the payload weight to store more fuel, however, will result in longer endurance. While a multi-rotor aircraft 100 is illustrated, the teachings of the present disclosure may similarly be applied to fixed wing aircraft having a hybrid-propulsion system.

Figure 2:
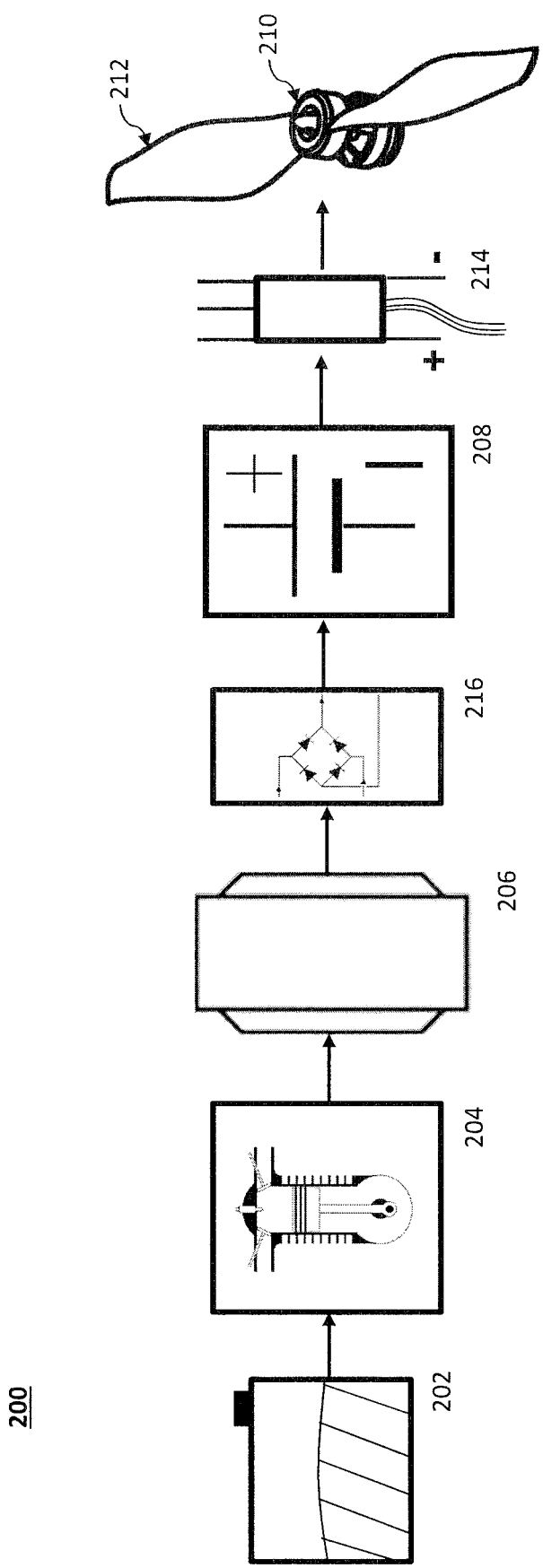
FIG. 2 illustrates an example architecture for a series hybrid-propulsion system.

FIG. 2 illustrates an example architecture for a series hybrid-propulsion system 200 that employs an internal combustion engine 204 and a motor/generator 206 to generate alternating current (AC) electric power and/or start the engine (i.e., function as a starter motor). The hybrid-propulsion system 200 uses an internal combustion engine 204 to supply power for direct electric drive of an electric motor 210 and, in turn, the propellers 212 (together defining a propulsor 108), while also allowing energy to be stored to a fuel tank 202 in the form of combustion fuels. For example, a hybrid-propulsion system 200 may include an internal combustion engine 204 coupled to a motor/generator 206 that drives, via a rectifier 216, one or more electric motors 210, which are directly coupled to the propeller shafts that drive a propeller 212, thereby combining the benefits of both low vibration electric power and energy dense internal combustion engine technology.

In operation, the internal combustion engine 204 receives propellants from a fuel tank 202. The force (e.g., a rotational force) generated by the internal combustion engine 204 is translated to the motor/generator 206, which, in turn, generates the AC electric power. The internal combustion engine 204 may be directly coupled to the motor/generator 206, or via one or more intermediate drive shafts. A rectifier 216 is electrically coupled with the motor/generator 206 to convert (i.e., rectify) the AC power from the motor/generator 206 to direct current (DC) power. The DC power from the motor/generator 206, via the rectifier 216, can be stored in a battery bank 208 (e.g., one or more battery cells) or, when DC motors are used, to drive one or more electric motors 210 (e.g., propulsors 108, including lift fans). The plurality of electric motors 210 may be electrically coupled with the battery bank 208 and/or the motor/generator 206 via an ESC 214. The ESC 214 is an electronic circuit operable to vary an electric motor's speed, its direction, and, in certain instances, to act as a dynamic brake. To the extent AC motors are used with the propulsors 108, the one or more electric motors may be directly coupled to an AC motor/generator 206 via the ESC 214, but coupled to the battery bank 208 through a DC to AC converter (i.e., an inverter).

The hybrid-propulsion system's 200 use of a battery bank 208 and propulsors 108 in conjunction with the internal combustion engine 204 significantly increases the safety margin for urban vertical lift systems by allowing the aircraft to land safely using battery power, even in the event of an engine failure—a safe-landing feature. In addition, as will be described, electric power stored to the battery bank 208 may be used to drive the motor/generator 206, thereby enabling the motor/generator 206 to function as an alternator or starter motor (i.e. providing an engine-starting feature), depending on the direction of power flow. In certain aspects, however, the battery bank 208 may be omitted to reduce weight and cost, but features that require reserve battery power (i.e., power stored to the battery bank 208) would be omitted, such as the safe-landing feature and the engine-starting feature, which occur when the internal combustion engine 204 is not running.

Fuel Tank 202.

A hybrid-propulsion system 200 may be configured to store, via fuel tank 202, energy in the form of liquid propellants, such as gasoline, ultra-low-sulfur biodiesel, cellulosic ethanol, etc. As mentioned above, such propellants provide greater usable energy compared to, for example, lithium batteries. The high energy density of such propellants allows for significant improvements in both vehicle endurance and payload size. Accordingly, in operation, the internal combustion engine 204 receives propellants from a fuel tank 202.

Internal Combustion Engine 204.

Figure 3B:
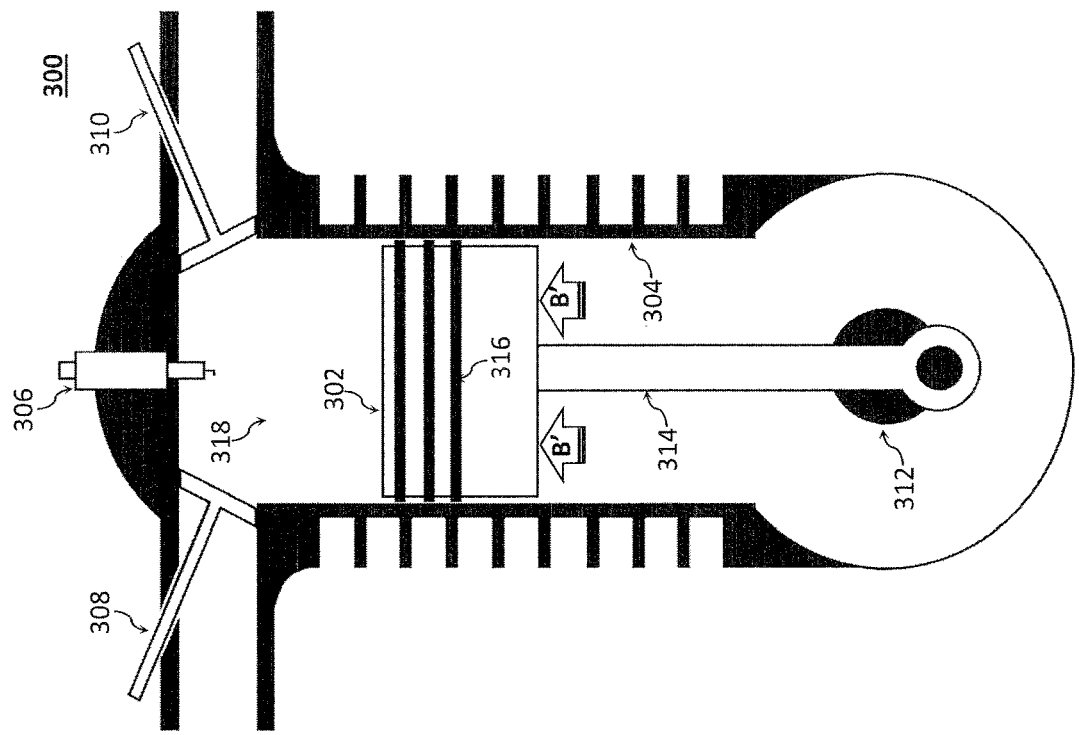
FIGS. 3a and 3b illustrate a cross section of an example piston assembly.
Figure 3A:
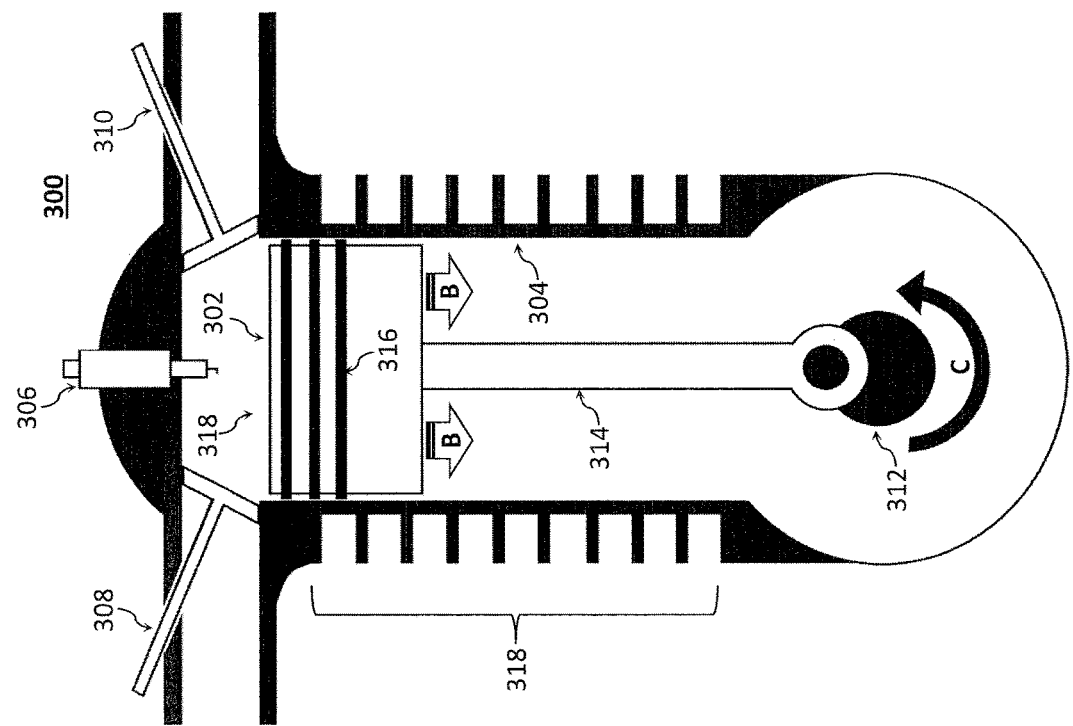

FIGS. 3a and 3b illustrate an example piston assembly 300 of an internal combustion engine 204 generally comprising a piston 302, a cylinder 304 (the interior of which define the cylindrical wall), and a spark plug 306. The exterior wall of the cylinder 304 may be provided with a plurality of cooling fins to dissipate heat. The piston 302 is connected to a crankshaft mechanism 312 via a piston rod 314. The piston 302 travels up and down within the cylinder 304, thereby driving the crankshaft mechanism 312 by rotating the crankshaft in direction C.

A groove may be cut onto the outer surface of the head of the piston 302 to received one or more rings 316. The one or more rings 316 operate to fill the region between the piston's 302 outer surface and inner wall of the cylinder 304 to provide an air seal. At the top of the piston's 302 journey are an intake engine valve 308 and an exhaust engine valve 310. A main function of the intake engine valve 308 and the exhaust engine valve 310 is to let air in and out of the cylinder's 304 combustion chamber 318.

A reciprocating internal combustion engine 204 traditionally uses two or four strokes, of which two are generally considered high-power: the power stroke of FIG. 3a (high power flow from the combustion gases within the combustion chamber 318 to the crankshaft mechanism 312) and the compression stroke of FIG. 3b (high power flow from the crankshaft mechanism 312 to the charge within the combustion chamber 318).

With reference to FIG. 3a, the piston 302 starts its motion from the top, moving downward within the cylinder 304 as indicated by arrows B. The intake engine valve 308 is opened (based on the crankshaft mechanism 312 or other controller), thereby allowing air/vaporized fuel mixture to enter to the combustion chamber 318. That air/vaporized fuel mixture is used to help ignite the fuel via spark plug 306, which will drive the piston 302 up (arrows B') and down (arrows B).

In operation, as the piston 302 reaches the top dead center, the spark plug 306 generates an electronic spark to ignite fuel droplets to form a flame front, thereby generating a pressure wave, a boundary layer within the chamber of the cylinder, and a squish (quench) band. Quench is the result of radially inward gas motion at the end of the compression stroke due to the geometry of the squish band. Squish is an effect in internal combustion engines that creates sudden turbulence of the fuel/air mixture as the piston 302 approaches top dead center.

The combustion yields a high power that is transmitted through to the crankshaft mechanism 312. As the piston 302 is at the bottom of the cylinder, which is illustrated in FIG. 3b, the intake engine valve 308 opens to let air in, it then closes so the cylinder is air tight to build compression within the combustion chamber 318. After reaching to the maximum displacement of the piston 302, most of the energy liberated is transferred. Accordingly, the piston 302 starts its upward motion (arrows B') to expel the exhaust gases within the combustion chamber 318 that result from the combustion. Once the piston 302 goes through the compression and firing stroke, the exhaust engine valve 310 will open and let the exhaust outside the cylinder 304 and the combustion chamber 318.

Passive Charge Cycle.

High energy combustion event vibration pulses tend to prohibit direct drive from an internal combustion engines and the response time constant is too high for effective vehicle controllability, so incorporating an internal combustion engine 204 was historically challenging. The disclosed internal combustion engine 204, however, employs a passive charge cycle, which applies the principles of the Miller cycle where the intake engine valve 308 is left open longer than it would be in an Otto cycle engine.

A primary characteristic of the passive charge cycle is that passive forced induction (with delayed intake valve timing) allows the expansion ratio to be greater than the compression ratio while maintaining power output without costly mechanisms such as a positive displacement super charger. Therefore, primary components are delayed intake valve timing, passive forced induction (which is possible due to the constant internal combustion engine speed), and a series hybrid architecture (which allows for constant internal combustion engine speed). A hybrid-propulsion system 200 passive intake charging supports an extended expansion phase and allows increased quench without detonation.

Efficiency is typically poor in internal combustion engines of sUAS because relative fuel droplet size has a major effect in small engines (i.e., <100 cc). A passive charge cycle provides delayed intake engine valve closing and allows greater engine cycle quench in the combustion chamber (without detonation) to confront the fuel droplet issues associated with small engines, as indicated by the lower Reynolds number scaling effects in small intake manifolds. That is, a passive charge cycle with delayed intake engine valve closing improves the mixing of the air/fuel mixture, thereby helping to reduce unburned hydrocarbons and resulting in higher efficiencies and lower hydrocarbon (e.g., $CO_2$) emissions.

The Miller cycle is a thermodynamic cycle used in a type of internal combustion engine. In the Miller cycle, the intake engine valve is left open longer than it would be in an Otto cycle engine. In effect, the compression stroke is two discrete cycles: the initial portion when the intake engine valve is open and final portion when the intake engine valve is closed. This two-stage intake stroke creates the so-called "fifth" stroke that the Miller cycle introduces. As the piston initially moves upwards in what is traditionally the compression stroke, the charge is partially expelled back out through the still-open intake engine valve. This loss of charge air results in a loss of power, thereby necessitating the need for a supercharger to compensate. For additional information, see example, U.S. Pat. No. 2,817,322 to Ralph Miller, issued on Dec. 24, 1957.

The Miller cycle, however, has several disadvantages due to its positive displacement mechanical supercharging, including: reduced efficiency due to friction and pumping losses (~20%); reduced reliability due to the added complexity of the supercharger; increased upfront costs; and increased maintenance cost due to lobe seal requirements. The disclosed internal combustion engine 204, however, employs a passive charge cycle to reduce the various upfront costs, long-term maintenance, and other issues typically associated with the Miller cycle by, inter alia, replacing the mechanical supercharger with harmonic forced induction.

In operation, the piston 302 begins to compress the fuel-air mixture only after the intake engine valve 308 closes; and the intake engine valve 308 closes after the piston 302 has traveled a certain distance above its bottom-most position (e.g., 20% to 30% of the total piston travel of this upward stroke). Therefore, the piston 302 actually compresses the fuel-air mixture only during the latter 70% to 80% of the compression stroke. During the initial part of the compression stroke, the piston 302 pushes part of the fuel-air mixture through the still-open intake engine valve 308, and back into the intake manifold.

Therefore, the disclosed hybrid-propulsion system employs a passive charge cycle that delays intake engine valve timing to allow the expansion ratio to be greater than the compression ratio. The increased efficiency afforded by the disclosed hybrid-propulsion system supports both increased endurance and range, reduces operating cost, and reduces the production of pollutants. While the delayed valve timing may be adjusted depending on the application and engine timing, the delay for a Gaui F-50 engine was determined to be approximately 9.5% of the total 4-stroke sinusoidal piston period time.

An analytical study was performed to estimate inlet geometry requirements required for passive charging. The intake and cylinder were modelled as a Helmholtz resonator with a changing volume, where an optimal effective inlet length for acoustic charging can be estimated based on inlet diameter and nominal engine speed and geometry. The results presented in FIG. 4*a* demonstrate that passive charging is viable with inlet geometries with both acceptable length and diameter for the target engine speed of 7,000 RPM. For additional information relating to geometry requirements for passive charging, see Thompson, M. "Non-Mechanical Supercharging of a Four-Stroke Diesel Engine," Ohio State University (1968) and Engelman, H. W. "Surge Phenomena in Engine Scavenging," University of Wisconsin (1953).

Figure 4B:
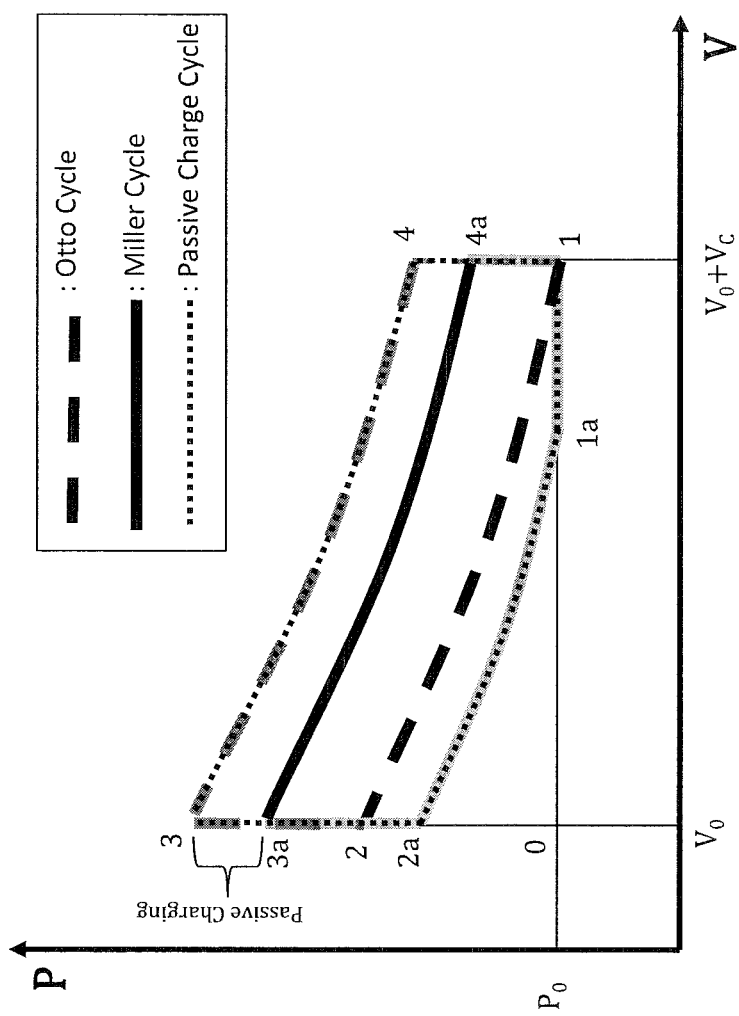
FIG. 4b illustrates a pressure-volume diagram comparison of the Otto Cycle to the passive charge cycle.

A comparison of pressure/volume diagrams for the Otto Cycle and the passive charge cycle are provided in FIG. 4*b*. The pressure volume diagrams describe the corresponding changes in volume and pressure in a cylinder. Specifically, FIG. 4*b* illustrates a pressure-volume diagram demonstrating the differences in the pressure-volume diagram between the Otto Cycle and the passive charge cycle. The passive charge cycle uses late intake engine valve 308 timing to eliminate part of the compression stroke. As illustrated in FIG. 4*b*, comparing points P5 and P4, the increased expansion ratio results in reduced pumping losses and greater energy extraction.

Single Speed Operation.

The hybrid-propulsion system's 200 passive charge cycle operates at a constant RPM position in order to use passive harmonic charging, thereby eliminating the need for the any mechanical supercharging. An advantage of the disclosed series hybrid-propulsion system 200 is that the propeller speed (measured as angular velocity/radian frequency (rad/sec), ω) of propeller 212 is independent of the motor/generator speed. That is, both the internal combustion engine 204 and the motor/generator 206 may operate at a constant RPM (i.e., constant ω), while the one or more electric motors 210 can operate at a variable RPM (i.e., variable ω) to provide controlled flight. Accordingly, the propeller can change speed instantly, while the internal combustion engine 204 and the motor/generator 206 will continue to operate at a constant speed.

The constant speed of the internal combustion engine 204 and the motor/generator 206 may be set to an optimal speed selected by the system designer to achieve maximum endurance for a particular set of hardware. The internal combustion engine 204 operates at a constant speed; therefore, the intake volume is in a constant frequency environment. A passive charging design, as opposed to a turbocharger, may then be applied and optimized because it needs to operate at only one frequency.

Advantages of the hybrid-propulsion system 200 are particularly apparent to urban vertical lift vehicles, which greatly benefit from improved safety and reduced noise signatures. By maintaining constant engine speed, the intake and exhaust mufflers can be optimized for this design point, reducing the noise signature of the vehicle. That is, the single speed operation allows the internal combustion engine 204 exhaust system and muffler to be tuned for minimum noise. In addition, the internal combustion engine 204 may be disabled (i.e., turned off) during approach/descent of the aircraft, thereby further reducing noise.

Motor/Generator.

The delayed valve timing also allows the motor/generator 206 in the hybrid-propulsion system 200 to be optimized for power generation, while still being able to start the internal combustion engine 204. This is due to the low starting torque of delayed intake engine valve 308 closure. The motor/generator 206 may be operated as the generator (i.e., an alternator driven by the internal combustion engine 204) to charge the battery bank 208 or power the one or more electric motors 210, or as a starting motor (i.e., powered by the battery bank 208) to start the internal combustion engine 204. Therefore, the motor/generator 206 can be capable of operating in either a "motor" mode or a "generator" mode, depending upon the commands given to the machine's controller (discussed below). When functioning as a motor to provide mechanical power, the input electrical power to the motor/generator 206 can be removed from the energy stored in the battery bank 208 and the traction power can be added to the power delivered to the powertrain shaft. Similarly, in generator mode the electrical power can be delivered to the battery bank 208 and shaft power can be subtracted from the powertrain shaft after relevant efficiencies are considered.

The motor/generator 206 may be, for example, a brushed or brushless AC or DC motor/generator. As can be appreciated, one or more AC to DC or DC to AC converters may be employed depending on the type (i.e., whether AC or DC) of motor/generator 206 or electric motor 210, and, where applicable, to charge the battery bank 208. For example, as illustrated in FIG. 2, a rectifier 216 may be employed to output the DC power needed to charge battery bank 208 and power electric motors 210, which are preferably DC.

The use of the alternator as an engine-starting device is usually prohibitive because the alternator would have to be built for both efficient energy generation and for high torque starting. That is, hybrid motor/generators historically needed to be oversized to provide sufficient power to start an internal combustion engine 204. The passive charge cycle, as a result of the delayed intake engine valve closing, requires much less starting power (e.g., has a low starting compression) and does not need a high torque starter. Accordingly, a lightweight, efficient alternator can also be used as a starter. Moreover, while traditional internal combustion engines 204 have a compression release built into the head to reduce starting power, the passive charge cycle obviates the need for such device complexity and weight.

Control System.

A system controller may be employed to control the combined internal combustion engine 204, motor/generator 206, recharging of battery bank 208, and engine-starting feature. Control of the propulsion components can be determined by a system controller. Input from a flight computer enables the system controller to determine the appropriate flight mode and configuration. Relevant commands actuate switches in the blocks and a state flow diagram monitors the state of charge of the battery and will indicate to the flight computer when the aerial vehicle should exit the loiter mode and start the engine so that the battery can be recharged. The system controller is preferably extremely environmentally rugged and weighs less than 1 pound.

Control Software.

The Controller Area Network (CAN) protocol, a form of serial datalink, can be used with the controller to communicate with other components in the system as well as with an operator located in the instrument room where data from the system can be recorded. This provides a fast, convenient, and efficient means by which to exchange large quantities of data and control signals. The two-wire serial network can be operated at a speed of 250 Kbps although speeds as high as 1 Mbps are available. In addition, three separate CAN 2.0B networks are available on the controller. To avoid reflections on the network, each end of the twisted pair databus can be terminated in its characteristic impedance of 120Ω. An engine control unit (ECU) calibration software tool (ECU software) can be used to send control commands to the CAN-enabled components, as well as display data in real time. As an example, the motor speed can easily be altered in flight by changing information on the display screen.

Figure 5:
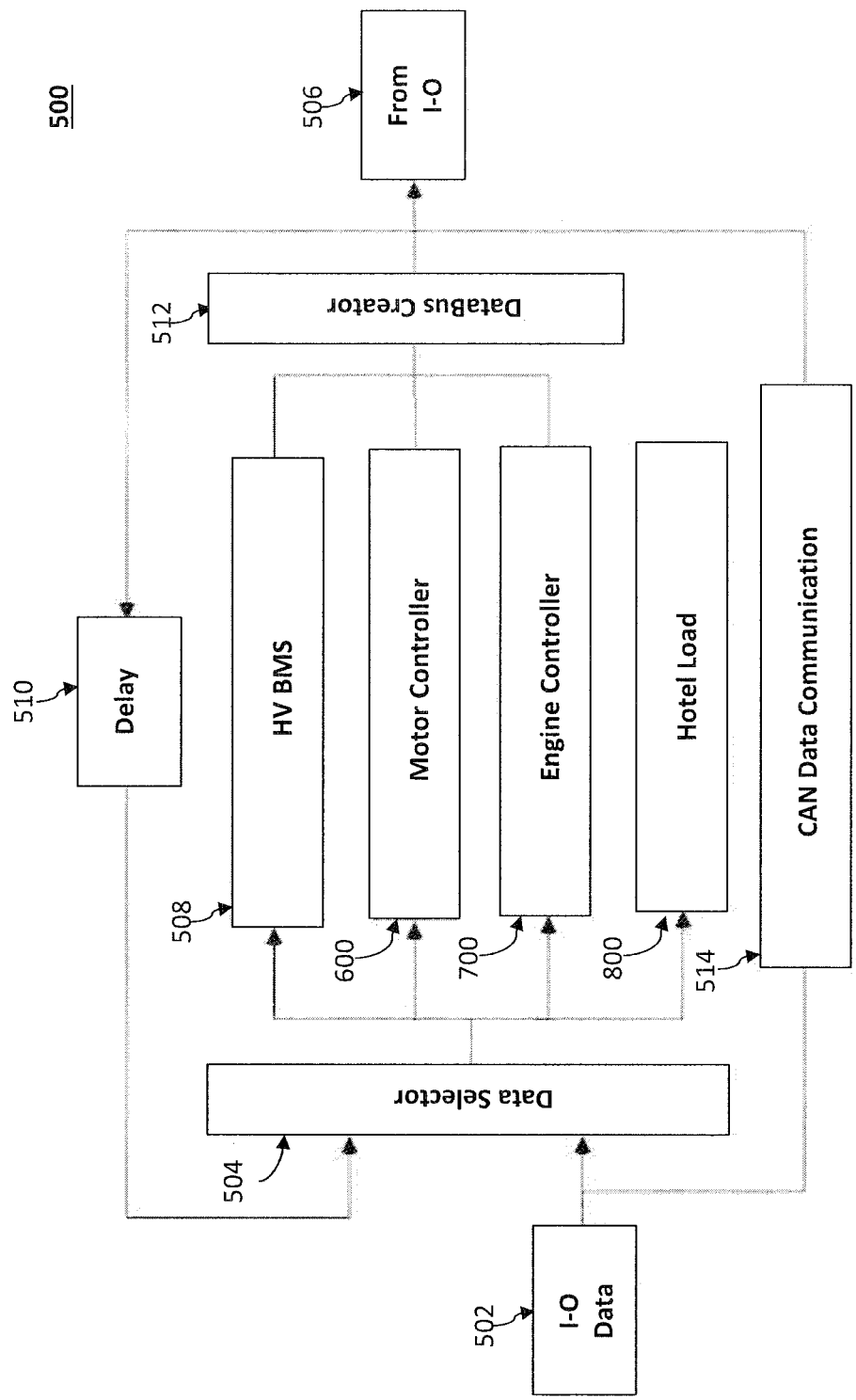
FIG. 5 illustrates a functional diagram description of the overall software architecture for a series hybrid-propulsion system.

A description of the I-O databus 500 is shown in the illustration presented in FIG. 5. A large amount of data and operating parameters can be maintained on the I-O databus 500. The data enters the I-O databus 500 via an I-O input 502 and exists via I-O output 506. Each of the subsystems (e.g., HV Battery Management System (BMS) 508, motor controller 600, engine controller 700, and hotel load 800) may use software blocks to identify and select data to be used and a bus generator 512 will then be used to repack the modified data and placed on the data bus before exiting the I-O databus 500. Throughout this process live data can be acquired, via CAN Data Communication 514, from various components such as the battery module by CAN receive blocks. Subsequently, messages can be transmitted, via CAN Data Communication 514, by means of CAN send blocks. The delay block 510 shown in the figure permits data to be constantly updated.

Figure 6:
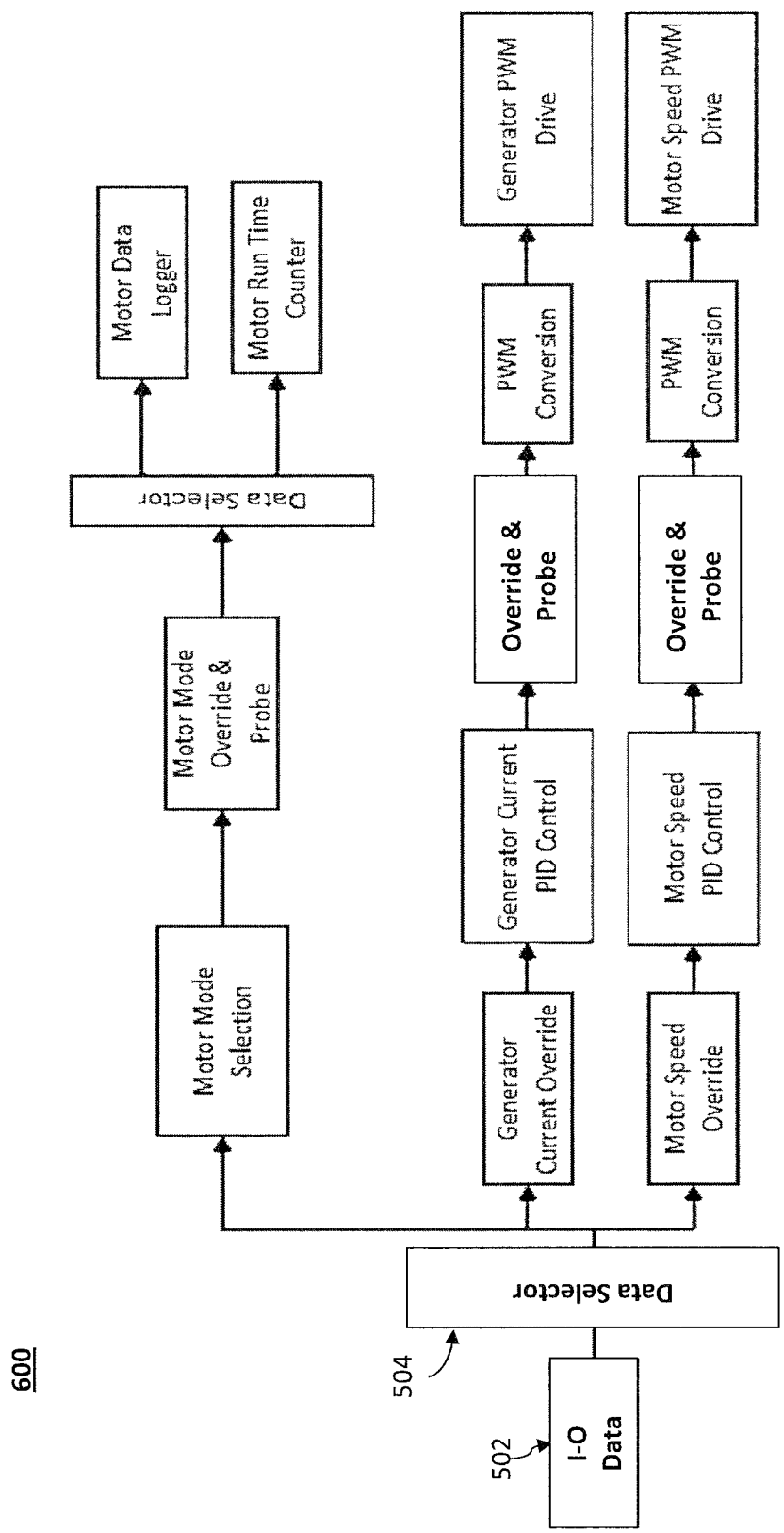
FIG. 6 illustrates a functional diagram description of the software used to operate the motor/generator.

A description of the software blocks of the motor controller 600 used to control the motor/generator is shown in FIG. 6. Similar to other subsystems in the program, relevant information is first selected from the I-O input 502. Among these can be the motor mode that designates whether the electro-mechanical machine can be operated as a motor or as a generator. Throughout the process, data is constantly logged and a run counter records the operation time in the various modes. When operated in a motoring mode, a proportional-integral-derivative (PID) controller block can be used in conjunction with other software to maintain a desired operating speed. It will also include a look-up table of desired speed as a function of a torque command; this approach minimizes acquisition time. Stabilization at the desired speed will then be provided by the PID block. This signal is then converted to an analog output of 0 to 10 volts by means of a pulse width modulation (PWM) drive whose variable pulse width is converted to direct current (DC) by a low-pass electronic circuit. Throughout this process, overrides and probe displays are provided. When the machine is operated as an electrical generator to charge the battery, the operation is somewhat similar to what has previously been described once this mode has been selected. A desired charge current is selected by the operator and a PID controller block somewhat similar to that used in the motoring mode is used to maintain a constant current.

Figure 7:
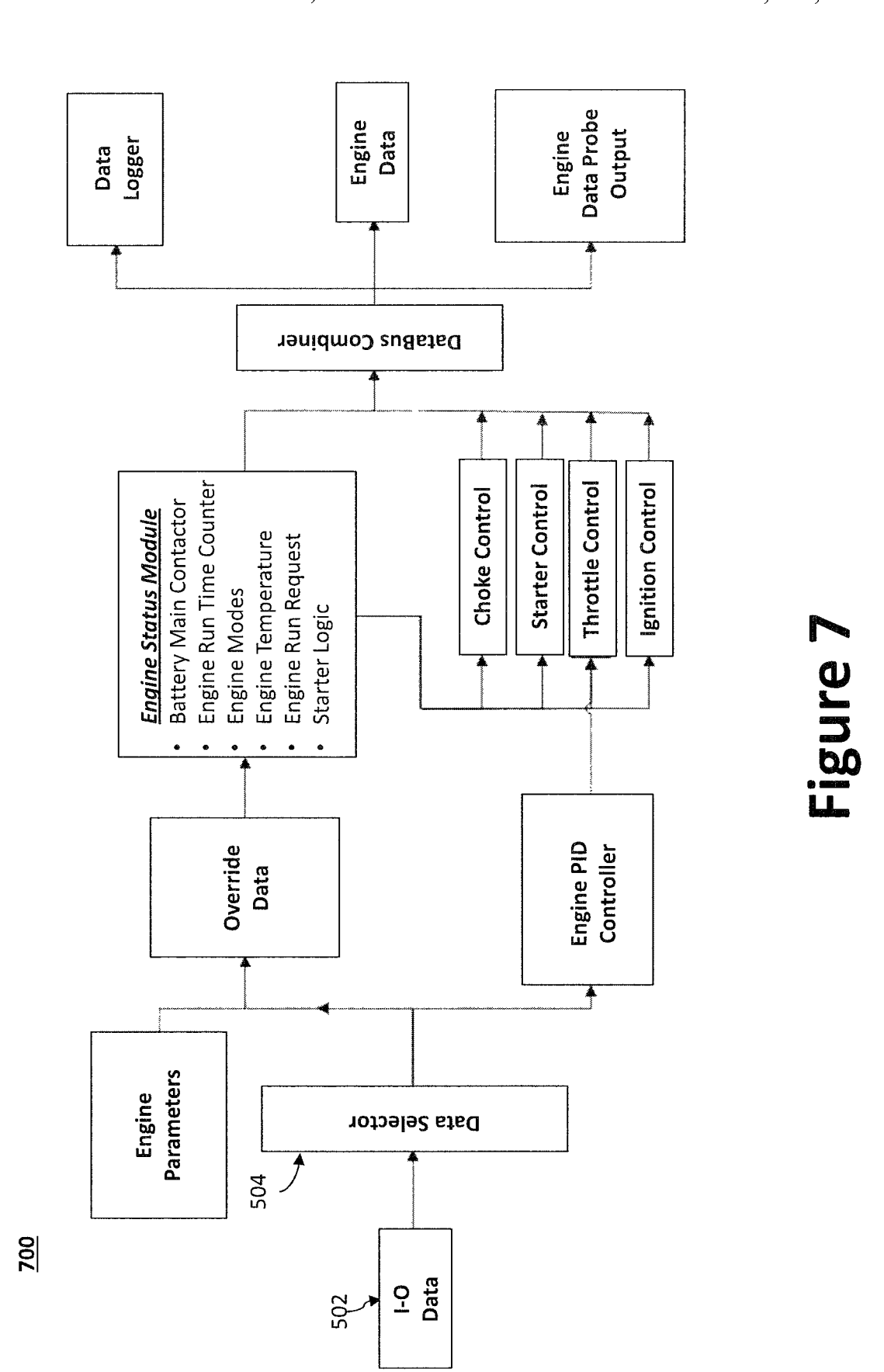
FIG. 7 illustrates a functional diagram description of the software used to control the engine.

An engine controller 700 software subsystem as shown in FIG. 7, which can be used to control the engine when it is engaged. Again, required information from the I-O input 502 can be acquired by means of a selector block and the updated information can be repackaged before exiting the block. Operation commands can be received in CAN messages. Among these can be commands to turn the ignition circuit on and off, to momentarily move the engine choke when starting the engine, to engage the starter motor for an appropriate period of time, and finally to actively control the engine throttle to maintain a desired engine speed. The ignition and starter features can be achieved by electromechanical relays operated by the controller when the appropriate signals are produced by the software. The choke and engine throttle can be physically moved by actuators that responded to PWM signals produced by the controller. Electronic circuits will condition these signals before they are actually applied to the actuators. A PID software controller, similar to that used with the electric motor, can be used to position the throttle. Features similar to that used with the other subsystems can be used to log the data, display relevant signals, and provide overrides at various locations in the software.

Figure 8:
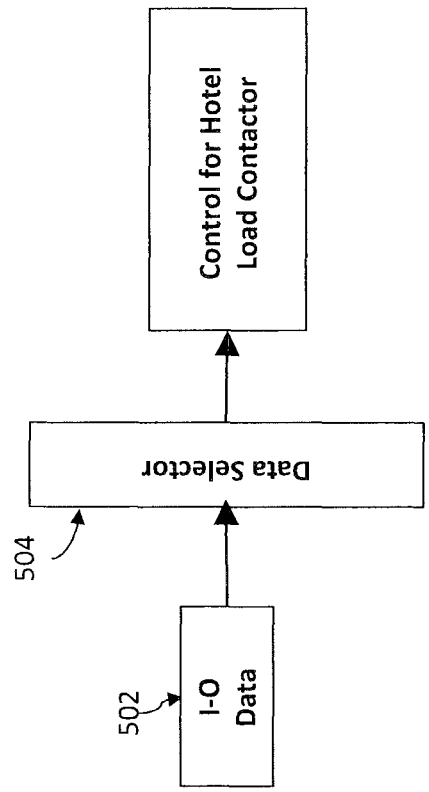
FIG. 8 illustrates a functional diagram description of the control subsystem for the hotel loads.

The hotel load 800 subsystem in the control system pertains to the operation of the non-propulsion electrical loads that principally will include the payload and is shown in FIG. 8. It is here referred to as the hotel load and represents loads that are considerably smaller than those associated with the electrical propulsion system (e.g., payload loads); however, they are a constant power drain on the battery and are included so that an accurate determination of the vehicle flight endurance can be obtained. Somewhat similar to the other control blocks, the controller provides a signal that actuates an electromechanical relay that completes the circuit that powers these loads. The control sequence is such that the contacts can be closed at the beginning of the simulation and open at its completion.

While the subject disclosure has been discussed primarily with regard to multi-rotor VTOL aircraft, other systems may also benefit, including, without limitation, ground vehicle propulsion, fixed wing propulsion, rotary wing propulsion, and stationary power generation.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations can be ascertainable to those of skill in the art. Thus, it is to be understood that the invention may therefore be practiced otherwise than as specifically described above.

What is claimed is:

1. A hybrid-electric aerial vehicle comprising:
    an airframe;
    a passively charged internal combustion engine operatively coupled with a fuel tank and configured to operate at a constant rotation per minute (RPM), the passively charged internal combustion engine having at least one cylinder comprising a combustion chamber, an intake engine valve, and an exhaust engine valve,
        wherein the intake engine valve and the exhaust engine valve are in fluid communication with the combustion chamber and configured, respectively, to selectively allow air in and out of the combustion chamber during operation,
        wherein the intake engine valve is controlled to provide an expansion ratio in the combustion chamber that is greater than a compression ratio in the combustion chamber;
    a generator operatively coupled with the passively charged internal combustion engine, wherein the generator is configured to generate AC power via a rotational engine force received from the passively charged internal combustion engine;
    a rectifier electrically coupled with the generator, wherein the rectifier converts AC power from the generator to DC power;
    a battery bank electrically coupled with the rectifier, the battery bank configured to store DC power via said rectifier; and
    a plurality of motors, each of said plurality of motors being operatively coupled with a propeller, wherein each of the plurality of motors is electrically coupled with the battery bank and the generator via an electronic speed controller (ESC) and configured to operate at a variable RPM.

2. The hybrid-electric aerial vehicle of claim 1, wherein the generator is directly coupled with the passively charged internal combustion engine.

3. The hybrid-electric aerial vehicle of claim 1, wherein the generator is coupled with the passively charged internal combustion engine via a driveshaft.

4. The hybrid-electric aerial vehicle of claim 1, wherein the timing of the intake engine valve is delayed in accordance with Miller cycle.

5. The hybrid-electric aerial vehicle of claim 1, wherein the plurality of motors is configured to provide both lift and propulsion.

6. The hybrid-electric aerial vehicle of claim 1, wherein tea timing of the intake engine valve is delayed such that the intake engine valve is held open by a predetermined period of time longer than prescribed by Otto cycle.

7. The hybrid-electric aerial vehicle of claim 1, wherein the generator is configured to receive DC power from the battery bank to output a rotational starter force to the internal combustion engine, thereby operating as a starter motor for the internal combustion engine.

8. A series hybrid-propulsion system comprising:
    a passively charged internal combustion engine operatively coupled with a fuel tank, the passively charged internal combustion engine having at least one cylinder comprising a combustion chamber, an intake engine valve, and an exhaust engine valve,
        wherein the intake engine valve and the exhaust engine valve are in fluid communication with the combustion chamber and configured, respectively, to selectively allow air in and out of the combustion chamber during operation,
        wherein the intake engine valve is controlled to provide an expansion ratio in the combustion chamber that is greater than a compression ratio in the combustion chamber;
    a generator operatively coupled with the passively charged internal combustion engine, wherein the generator is configured to generate AC power via a rotational engine force received from the passively charged internal combustion engine;
    a rectifier electrically coupled with the generator, wherein the rectifier converts AC power from the generator to DC power;
    a battery bank electrically coupled with the rectifier, the battery bank configured to store DC power from said rectifier; and
    a plurality of motors electrically coupled with the battery bank and the generator via an electronic speed controller (ESC) and configured to operate at a variable rotation per minute (RPM) while the passively charged internal combustion engine operates at a constant RPM.

9. The series hybrid-propulsion system of claim 8, wherein the generator is directly coupled with the passively charged internal combustion engine.

10. The series hybrid-propulsion system of claim 8, wherein the generator is coupled with the passively charged internal combustion engine via a driveshaft.

11. The series hybrid-propulsion system of claim 8, wherein timing of the intake engine valve is delayed in accordance with Miller cycle.

12. The series hybrid-propulsion system of claim 8, wherein timing of the intake engine valve is delayed such that the intake engine valve is held open by a predetermined period of time longer than prescribed by Otto cycle.

13. The series hybrid-propulsion system of claim 8, wherein the generator is configured to receive DC power from the battery bank to output a rotational starter force to the passively charged internal combustion engine, thereby operating as a starter motor for the passively charged internal combustion engine.

14. A method for driving a hybrid-propulsion system comprising:
  operating a passively charged internal combustion engine operatively coupled with a fuel tank at a constant rotation per minute (RPM),
   wherein the passively charged internal combustion engine comprises at least one cylinder, a combustion chamber, an intake engine valve, and an exhaust engine valve, and
   wherein the intake engine valve and the exhaust engine valve are in fluid communication with the combustion chamber;
  selectively conveying air in and out of the combustion chamber in accordance with Miller cycle to provide an expansion ratio in the combustion chamber that is greater than a compression ratio in the combustion chamber;
  generating AC power via a rotational engine force received at a generator from the passively charged internal combustion engine, wherein the generator is operatively coupled with the passively charged internal combustion engine;
  converting AC power from the generator to DC power via a rectifier electrically coupled with the generator;
  storing DC power from said rectifier to a battery bank electrically coupled with the rectifier; and
  operating an electric motor at a variable RPM via an electronic speed controller (ESC) while the passively charged internal combustion engine operates at the constant RPM.

15. The method of claim 14, wherein the generator is configured to receive DC power from the battery bank to output a rotational starter force to the passively charged internal combustion engine, thereby operating as a starter motor for the passively charged internal combustion engine.

16. The method of claim 14, wherein the generator is directly coupled with the passively charged internal combustion engine.

17. The method of claim 14, wherein the motor is configured to provide both lift and propulsion.

18. The method of claim 14, further comprising the step of delaying timing of the intake engine valve such that the intake engine valve is held open by a predetermined period of time longer than prescribed by Otto cycle.

19. The method of claim 14, wherein the generator is coupled with the passively charged internal combustion engine via a driveshaft.

* * * * *